United States Patent [19]

Hurley

[11] Patent Number: 5,140,305
[45] Date of Patent: Aug. 18, 1992

[54] SPEED SENSOR FAILURE DETECTION METHOD AND APPARATUS FOR AN OVERSPEED PROTECTION SYSTEM

[75] Inventor: Joseph D. Hurley, Casselberry, Fla.

[73] Assignee: Westinghouse Electric Corp., Pittsburgh, Pa.

[21] Appl. No.: 643,032

[22] Filed: Jan. 17, 1991

[51] Int. Cl.$^5$ .................. G08B 29/00; G01P 3/56
[52] U.S. Cl. ...................... 340/508; 340/670; 340/671; 340/679; 340/657; 340/661; 340/441; 324/161; 324/163; 324/166
[58] Field of Search .......... 340/508, 669-672, 340/679, 657, 661, 441, 438, 439; 324/160, 161, 164, 166, 163; 235/104

[56] References Cited

U.S. PATENT DOCUMENTS

| | | | |
|---|---|---|---|
| 3,450,944 | 6/1969 | Burke | 340/670 |
| 3,803,425 | 4/1974 | Carp | 324/161 |
| 4,161,717 | 7/1979 | Hoover et al. | 340/671 |
| 4,365,298 | 12/1982 | Sibley et al. | 340/670 |
| 4,777,611 | 10/1988 | Tashiro et al. | 324/161 |
| 4,808,920 | 2/1989 | Brauninger et al. | 324/166 |
| 4,876,527 | 10/1989 | Oka et al. | 340/441 |

Primary Examiner—Donnie L. Crosland

[57] ABSTRACT

An apparatus for detecting speed sensor failure in an overspeed protection device is disclosed. The apparatus comprises a plurality of tachometers having outputs for indicating the speed of rotation of a machine relative to plural setpoints. If the comparison indicates that certain conditions exist, then a sensor failue is indicated. The apparatus may also be employed to detect a failure of, or loss of power to or within, one of the tachometers.

15 Claims, 4 Drawing Sheets

5,140,305

SPEED SENSOR FAILURE DETECTION METHOD AND APPARATUS FOR AN OVERSPEED PROTECTION SYSTEM

FIELD OF THE INVENTION

The present invention relates generally to speed sensing in a rotating machine. More particularly, the present invention relates to a method and apparatus for detecting the failure of a speed sensor in an overspeed protection system.

BACKGROUND OF THE INVENTION

The speed of a rotating machine is typically sensed by stationary sensors, such as magnetic speed pickups, mounted around the shaft and sensing the frequency of passage of a series of discrete discontinuities on the shaft, for example, teeth on a toothed wheel. The speed information is generally supplied to an overspeed protection system which shuts down the machine if an overspeed or runaway condition is detected. For obvious reasons, it is important in such overspeed protection systems that the sensors reliably sense speed. The ability to detect whether one or more sensors is not correctly sensing speed is also important so that the appropriate sensor(s) can be identified and, if necessary, repaired or replaced. Detection of a failed sensor may also call for automatic adjustments in the overspeed protection logic to account for such a condition.

One known method of detecting the failure of a speed sensor is to sense when the speed signal is totally lost. However, such a method is unable to distinguish between the loss of signal due to a failure of a speed sensor and the normal decay of the signal to zero which will occur during a machine coastdown to zero speed.

In another known method employed in a multiple sensor system, each speed signal is converted to an analog voltage proportional to sensed speed. If the analog voltage created by one sensor does not match the voltage created by other sensors (within certain tolerances), then the sensor with the mismatched analog voltage is considered to have failed. Such a system, however, requires complex and expensive analog detection and comparison circuitry which is beyond the capabilities of many simple applications.

It is therefore desirable to provide a method and apparatus for detecting speed sensor failure in an overspeed protection system which is simple, reliable and inexpensive to implement, while reliably distinguishing between sensor failure and normal machine coastdown. The present invention achieves these goals.

SUMMARY OF THE INVENTION

The present invention is for specific use in a machine having a rotatable element, such as a shaft, but is not limited thereto. As is common, a plurality of sensors is arranged around the rotatable element to provide speed signals indicative of the speed of rotation of the rotatable element (e.g., pulses having a frequency that increases with increasing speed of rotation). According to the invention, an apparatus for detecting sensor failure comprises first means receiving the speed signals and having plural underspeed setpoints with values staggered below a normal operating speed value of the rotatable element. The first means provides underspeed outputs indicative of whether each speed signal has a magnitude above or below the values of selected ones of the underspeed setpoints.

Second means receive the underspeed output signals provided by the first means and detect whether the underspeed outputs indicate that one of the speed signals has a magnitude below the value of one of the underspeed setpoints when at least one other speed signal has a magnitude above another underspeed setpoint of greater value. In response, the second means provides a first signal for indicating that one of the sensors has failed.

According to a preferred embodiment of the invention, the first means comprises a plurality of tachometers equal in number to the number of sensors, with each tachometer receiving a different speed signal.

According to yet a further embodiment of the invention, the first means further has overspeed setpoints set therein each having a value greater than the normal operating speed value. The first means further provides overspeed outputs indicative of whether each speed signal has a magnitude above or below the value of its associated overspeed setpoint. According to this embodiment, the second means is responsive to the overspeed outputs to detect whether any overspeed output indicates that the magnitude of one of the speed signals is above an associated overspeed setpoint when an underspeed output indicates that the same speed signal has a magnitude below one of the underspeed setpoints. In response, the second means provides a second signal for indicating a failure of or loss of power to or within the first means.

BRIEF DESCRIPTION OF THE DRAWINGS

The invention will become more readily apparent from the following description of a preferred embodiment thereof shown, by way of example only, in the accompanying drawings wherein.

DETAILED DESCRIPTION OF THE DRAWINGS

Figure 1:
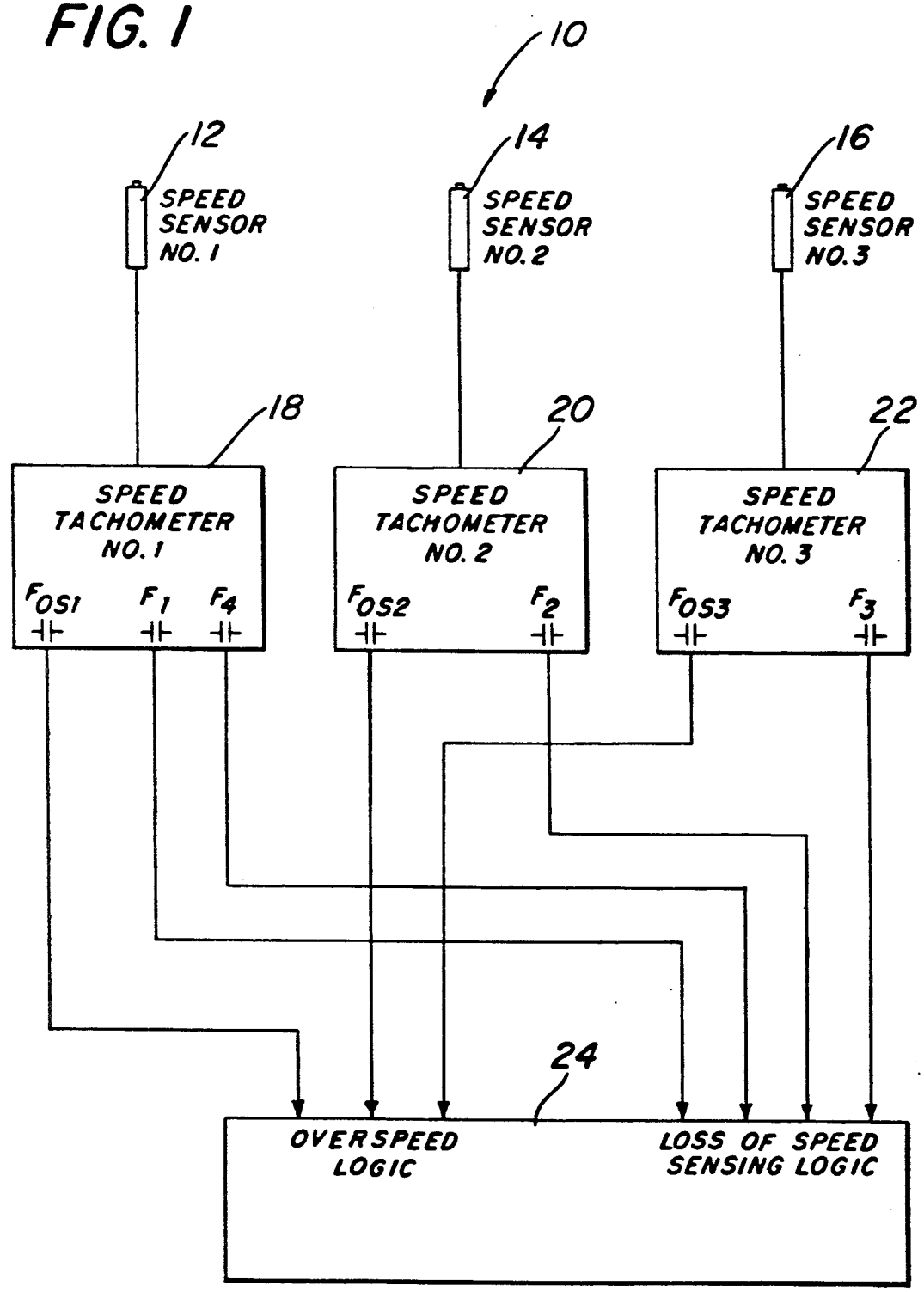
FIG. 1 is a block diagram illustrating a speed sensor failure detection apparatus according to the present invention.

Referring to the drawings, wherein like numerals represent like elements, there is illustrated in FIG. 1 an apparatus 10 for detecting sensor failure, and failure of or loss of power to or within an overspeed protection device according to the present invention. As is common, a plurality N of sensors 12, 14, 16 are disposed around the rotatable element, e.g, shaft, of a rotating machine for measuring its speed. Although only three sensors 12, 14, 16 are shown, it should be understood that this is for illustrative purposes only, and the present invention may be employed with the use of two or more sensors.

The output of each sensor 12, 14, 16 is provided to a respective one of a speed tachometer 18, 20, 22, as shown. Each of the speed tachometers 18, 20, 22 may be a commercially available speed tachometer such as a model Tach-Pak 3 manufactured by Airpax Corporation. As will be explained hereinafter, each speed tachometer has overspeed and underspeed setpoints, and corresponding overspeed and underspeed outputs, that are provided to processing circuitry 24 for detecting a failed sensor and/or a failure of or loss of power to or within a tachometer.

The speed tachometers 18, 20, 22 are of the well-known type that have multiple, digital (on-off) logic outputs and setpoints. Each logic output changes state when the frequency of the sensor signal supplied to the tachometer passes through the setpoints (underspeed or overspeed) corresponding to that logic output. The above mentioned, commercially available speed tachometers have overspeed setpoints and outputs for detecting an overspeed or run-away condition of the machine. According to the invention, additional outputs with associated underspeed setpoints staggered below normal operating speed are utilized for speed sensor failure detection. The modifications necessary to implement these setpoints and outputs will be readily apparent to those skilled in the art.

Referring again to FIG. 1, "underspeed" outputs of each tachometer $F_1$ through $F_4$, and "overspeed" outputs $F_{OS1}$ through $F_{OS3}$, are shown as relay contacts, but each tachometer may provide a digital output voltage instead. The contacts shown for each tachometer 18, 20, 22 indicate digital logic outputs which change state when the frequency of the signal from the respective sensor 12, 14, 16 to the tachometer goes above or below the underspeed or overspeed frequency setpoint set into the tachometer for each output.

Figure 2:
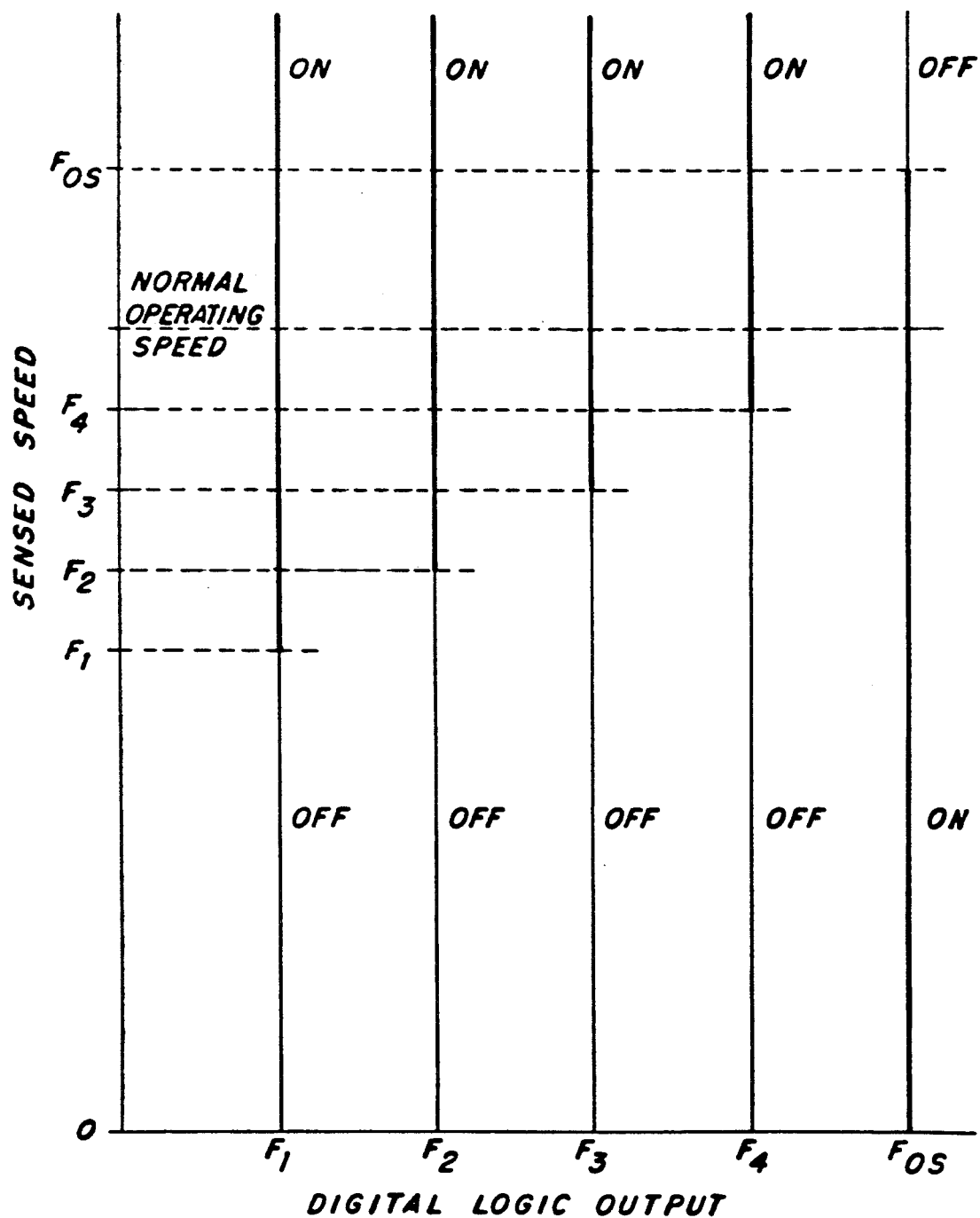
FIG. 2 is a chart illustrating the operation of the apparatus of FIG. 1.

FIG. 2 is a chart of the typical relationship between the underspeed and overspeed setpoints and each corresponding underspeed output for the apparatus of FIG. 1. It will be seen that although there are three sensors 12, 14, 16 and three tachometers 18, 20, 22, there are a total of four underspeed outputs $F_1$ and $F_4$ corresponding to underspeed conditions (i.e., relative to a normal operating speed of the machine). Each tachometer also has an overspeed output $F_{OS}$ for indicating an overspeed condition as reported by a respective one of the speed sensors 12, 14, 16 relative to a normal operating speed of the machine.

By way of example, referring to FIG. 2, it will be seen that the underspeed output $F_1$ of tachometer 18 is "off" when the sensed speed is below the value of the corresponding underspeed setpoint $F_1$ in FIG. 2 and is "on" when the sensed speed is above the value of the underspeed setpoint $F_1$. At normal operating speed, underspeed outputs $F_1$ and $F_4$ will be "on". If the signal from sensor 12 is removed, then outputs $F_1$ and $F_4$ will be "off."

As shown, tachometer 18 employs two underspeed outputs ($F_1$ and $F_4$) having underspeed setpoints set below the normal operating speed value of the machine. The remaining tachometers 20, 22 each utilize one underspeed output $F_2$ and $F_3$, respectively, also with an underspeed setpoint having a value below the normal operating speed value. As seen in FIG. 2, the underspeed setpoints $F_1$ and $F_4$ of tachometer 18 are adjusted such that they have values above and below the values of the underspeed setpoints of the other tachometers 20, 22. In other words, the underspeed setpoints $F_1$ and $F_4$ of tachometer 18 define uppermost and lowermost underspeed limits. All of the underspeed setpoints should be separated by a speed deviation which is greater than the accuracy of the speed sensing.

For a system employing three sensors, the hardware is connected as shown in FIG. 1, and the underspeed setpoints are adjusted as shown in FIG. 2. During a normal startup or coastdown the underspeed outputs $F_1$, $F_2$, $F_3$ and $F_4$ will turn "on" and "off" in their respective sequence. At normal operating speed, the loss of any speed sensor will cause the underspeed output(s) of the tachometer for that sensor turn "off". The simultaneous existence of any other underspeed output in an "on" state will indicate a failed sensor if the underspeed setpoint associated with the suspect sensor (i.e., that sensor whose underspeed output turned "off") has a value below the value of the setpoint(s) corresponding to any underspeed outputs that are "on". In other words, if one of the underspeed outputs indicates that an associated one of the speed signals has a magnitude below the value of an associated underspeed setpoint when at least one other speed signal has a magnitude above another underspeed setpoint of greater value, then a sensor failure is indicated. The failed sensor is the sensor whose underspeed output turned "off".

Again, by way of example, at normal operating speed, if sensor 14 should fail, underspeed $F_2$ will go "off". Since underspeed outputs $F_3$ and $F_4$ are still in the "on" state at normal speed, this will indicate that sensor 14 has failed. If underspeed output $F_2$ turns to the "off" state in the course of a normal coastdown rather than a failed sensor, then underspeed outputs $F_3$ and $F_4$ would have already gone "off", indicating no failed sensor.

Processing circuitry 24, which may be a digital logic circuit or an appropriately programed computer, receives the outputs from the tachometers 18, 20, 22 detects the above mentioned conditions and provides signals indicating which sensor has failed.

Figure 3:
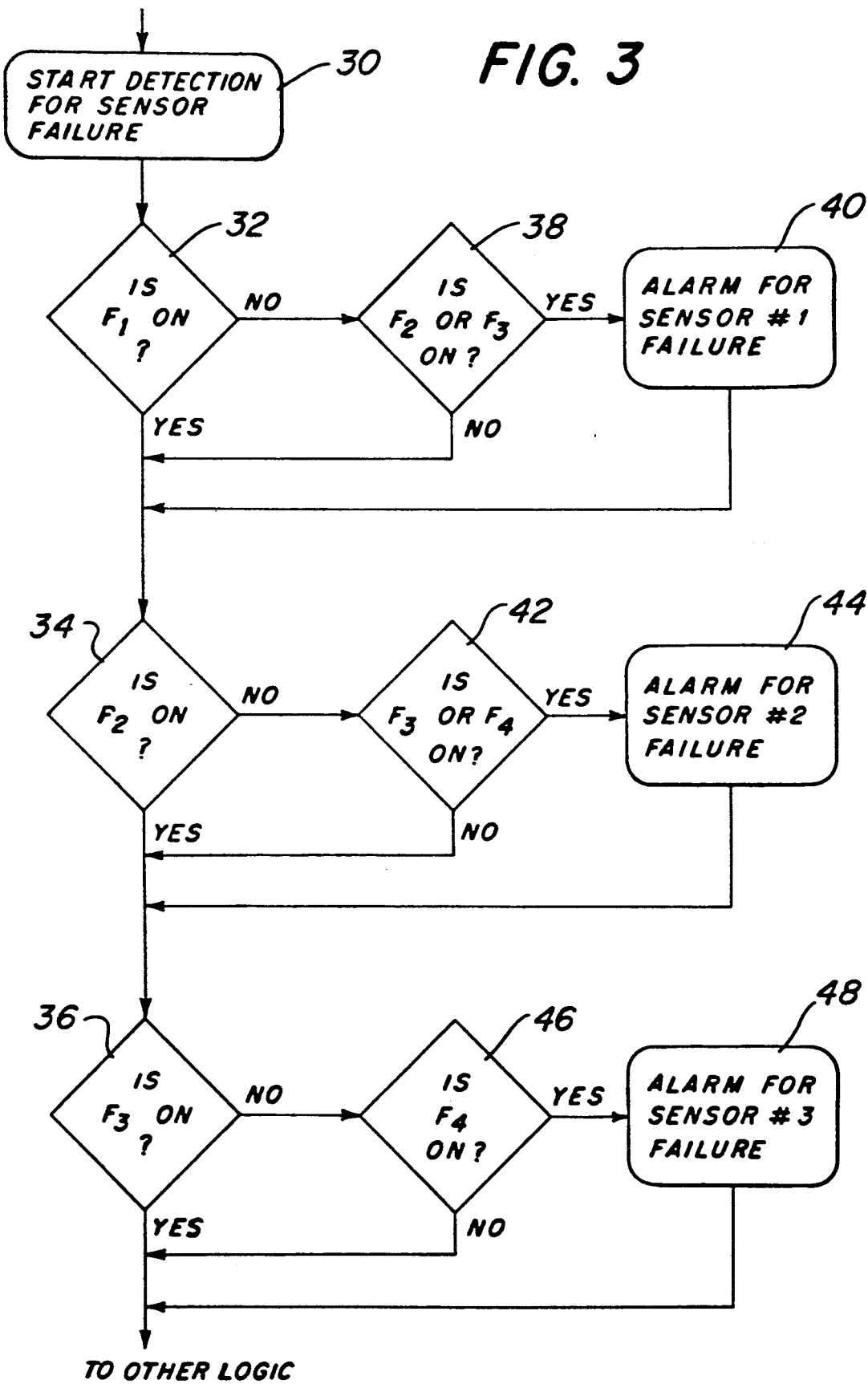
FIG. 3 is a flowchart illustrating one method of detecting a sensor failure according to the present invention.

The flowchart of FIG. 3 illustrates the logical steps needed to detect a failed sensor for a system having three sensors. Similar logic is applicable to a system with two or more sensors. The processing circuitry 24 is preferably configured to carry out the steps shown in FIG. 3.

As shown in FIG. 3, the routine is begun at 30. First, the status of underspeed output $F_1$ is checked, as shown at block 32. If underspeed output $F_1$ is "off", then the status of underspeed outputs $F_2$ and/or $F_3$ is/are checked, as shown at block 38. If either one of underspeed outputs $F_2$ or $F_3$ is "on", then an alarm is sounded to indicate that sensor 12 has failed.

If, at block 32, it was determined that underspeed output $F_1$ was "on", then the status of underspeed output $F_2$ is checked, as shown at block 34. If it is determined that underspeed output $F_2$ is "off", then the status of underspeed outputs $F_3$ and/or $F_4$ is/are checked, as shown at block 42. If either one of underspeed outputs $F_3$ or $F_4$ is determined to be "on", then an alarm is sounded to indicate that sensor 14 has failed, as shown at block 44.

The status of underspeed output $F_3$ is next checked, as shown at block 36. If underspeed output $F_3$ is "off", then the status of underspeed output $F_4$ is checked, as shown at block 46. If underspeed output $F_4$ is "on", then an alarm is provided for indicating that sensor 16 has failed, as shown at block 48.

The apparatus described above may also be employed to detect failure of, or loss of power to or within, one or more of the tachometers 12, 14, 16. From zero speed through normal operating speed, the overspeed output $F_{OS}$ associated with overspeed detection will be "on" for each tachometer. When the speed exceeds the overspeed setpoint $F_{OS}$, this output will be "off", indicating an overspeed condition. If the tachometer is operating properly during such an overspeed condition, the underspeed outputs will remain "on". However, if power to or within a tachometer is lost, or there is a failure in the tachometer, then both the overspeed output and the underspeed output(s) will be off. This combination of conditions will indicate a failure in, or a loss of power to or within, the tachometer. Processing circuitry 24 may be configured to detect this condition and provide an output accordingly.

Figure 4:
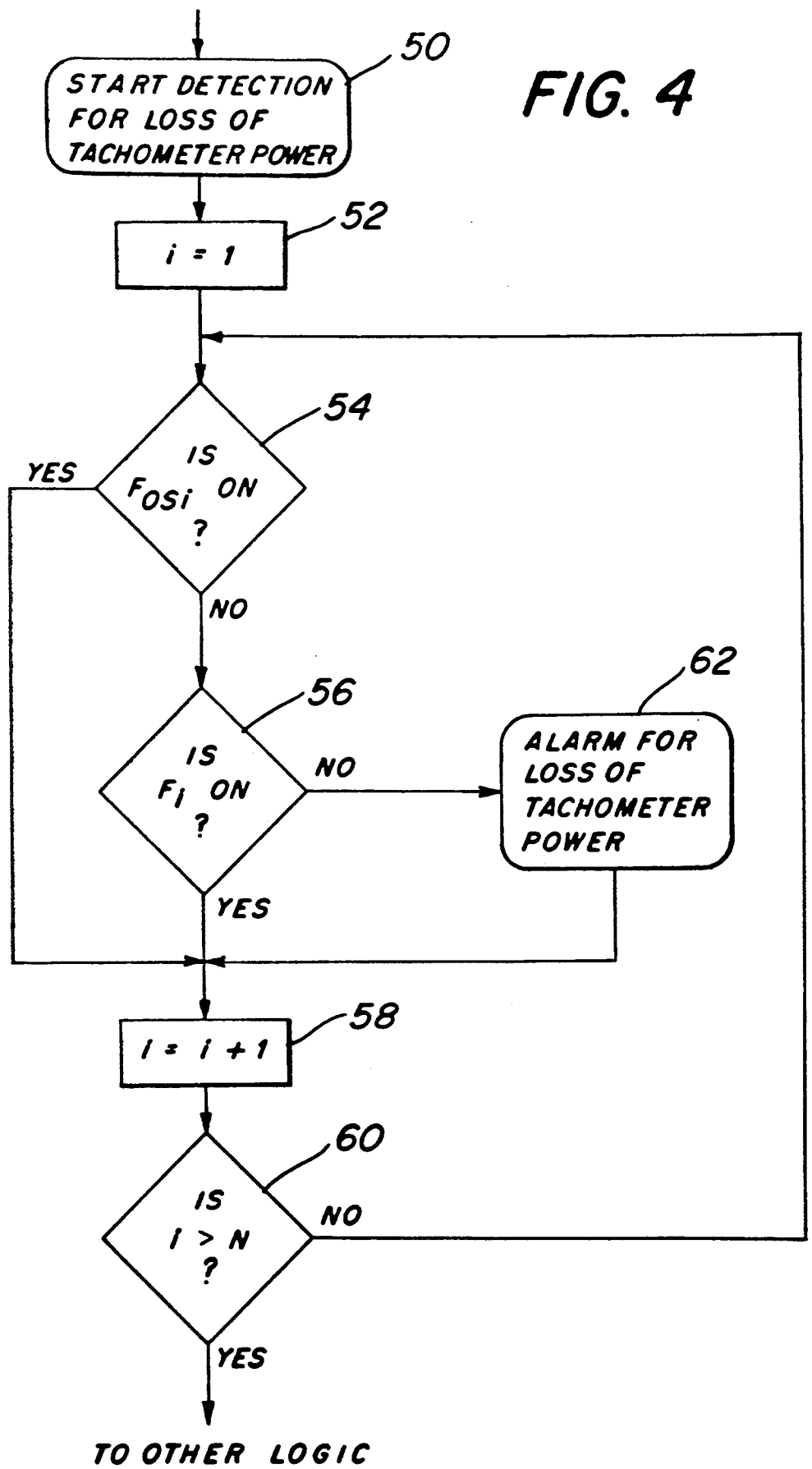
FIG. 4 is a flowchart illustrating one method of detecting a failure of or loss of power to or within a tachometer according to the present invention.

FIG. 4 illustrates the logical steps needed to detect failure of, or loss of power to or within, a tachometer according to the present invention. The processing circuitry 24 preferably configured to cart out the steps shown in FIG. 4.

As shown, a routine for detecting tachometer failure or loss of power is begun at block 50. At block 52, a counter is initiated to indicate which tachometer 18, 20, 22 is to be checked. At block 54, the overspeed output $F_{OS}$ of the tachometer being checked is examined to determine its status. If the overspeed output $F_{OS}$ is "off", then the status of the underspeed output(s) associated with the tachometer under consideration is also examined, as shown at block 56. If the associated underspeed output is also "off", then this indicates a failure of or loss of power to or within the tachometer, and an alarm is sounded for this tachometer, as shown at block 62. At block 58, the counter is incremented to repeat the foregoing process for the next tachometer. All tachometers are checked until, at block 60, the last tachometer has been considered.

There has been described an apparatus and method for detecting speed sensor failure, as well as for detecting failure of, or loss of power to or within, a tachometer, in an overspeed detection device. The present invention may be embodied in other specific forms without departing from the spirit or essential attributes of the invention, and accordingly, reference should be made to the following claims rather to the foregoing specification, as indicating the scope of the invention.

I claim:

1. In a machine having a rotatable element and a plurality of sensors arranged to provide speed signals indicative of the speed of rotation of the rotatable element, an apparatus for detecting sensor failure comprising:
   a) first means receiving the speed signals and having plural underspeed setpoints with respective values staggered below a normal operating speed value of the rotatable element for providing underspeed outputs indicative of whether each speed signal has a magnitude above or below the values of selected ones of the underspeed setpoints; and
   b) second means for detecting whether the underspeed outputs indicate that any one of the speed signals has a magnitude below the value of its respective underspeed setpoint when at least one other speed signal has a magnitude above another underspeed setpoint of greater value, and, in response, providing a first signal for indicating that one of the sensors has failed.

2. Apparatus according to claim 1 wherein the failed sensor is the sensor providing the speed signal having the magnitude below the value of said one of the underspeed setpoints.

3. Apparatus according to claim wherein the values of the underspeed setpoints are separated by an amount greater than a speed sensing accuracy of the apparatus.

4. Apparatus according to claim wherein a different one of each of the underspeed setpoints is associated with each of the sensors, two of the underspeed setpoints being associated with a selected one of the sensors and the underspeed setpoints associated with the remaining sensors having values between the values of the two underspeed setpoints associated with the selected sensor.

5. Apparatus according to claim wherein the underspeed outputs from the first means are contact closures.

6. Apparatus according to claim wherein the underspeed outputs from the first means are digital logic levels.

7. Apparatus according to claim 1 wherein the first means comprises a plurality of tachometers.

8. Apparatus according to claim 4 wherein the first means comprises a plurality of tachometers equal in number to the number of sensors, each tachometer receiving a different speed signal, the tachometer receiving the speed signal from the selected sensor having set therein the two underspeed setpoints associated with the selected sensor.

9. Apparatus according to claim 1 wherein:
   (i) the first means further has overspeed setpoints having values greater than the normal operating speed value, there being an overspeed setpoint associated with each speed signal, the first means further providing overspeed outputs indicative of whether each speed signal has a magnitude above or below the value of its associated overspeed setpoint; and,
   (ii) the second means is responsive to the overspeed outputs for detecting whether any overspeed output indicates that the magnitude of one of the speed signals is above its associated overspeed setpoint when an underspeed output indicates that the same speed signal has a magnitude below one of the underspeed setpoints, and, in response, providing a second signal for indicating a failure in the first means.

10. Speed sensor failure detection apparatus comprising:
   a) a plurality of sensors disposed about a rotatable element, each sensor being arranged to provide a speed signal indicative of a speed of rotation of the rotatable element;
   b) first means receiving each of the speed signals for comparison to a different one of a plurality of underspeed setpoints having respective values staggered below a normal operating speed value of the rotatable element, a different one of each of the underspeed setpoints being associated with each of the sensors, two of the underspeed setpoints being associated with a selected one of the sensors and the remaining underspeed setpoints having values between the values of the two underspeed setpoints associated with the selected sensor, the values of all of the underspeed setpoints being separated by an amount greater than a speed sensing accuracy of the apparatus, the first means providing, based upon the comparison, a plurality of first signals each associated with a sensor and with a different underspeed setpoint and each assuming one of a first or second state for respectively indicating whether an associated one of the speed signals has a value above or below the underspeed setpoint to which it has been compared; and, c) second means receiving the first signals for determining whether any one of the first signals has assumed the second state when at least one other one of the first signals associated with a setpoint of greater value has assumed the first state, and, in response, providing an indication that the sensor associated with the first signal that has assumed the second state has failed.

11. Apparatus according to claim 10 wherein:

(i) the first means further has overspeed setpoints having values greater than the normal operating speed value, there being an overspeed setpoint associated with each speed signal, the first means further providing overspeed outputs indicative of whether each speed signal has a magnitude above or below the value of its associated overspeed setpoint; and, (ii) the second means detects whether any overspeed output indicates that its associated speed signal has a magnitude above its associated overspeed setpoint when an underspeed output associated with the same speed signal is below one of the underspeed setpoints, and, in response, providing an indication of a failure in the first means.

12. Apparatus according to claim 10 wherein the first means comprises a plurality of tachometers equal in number to the number of sensors, each tachometer receiving a different speed signal, the tachometer receiving the speed signal from the selected sensor having set therein the two underspeed setpoints associated with the selected sensor.

13. In a rotating machine having a plurality N of sensors for measuring machine speed, a speed sensor failure detection apparatus comprising:

a) a plurality N of tachometers each receiving a speed signal from a different one of the sensors such that a tachometer is associated with each speed signal, each tachometer having set therein a different underspeed setpoint with a value below a normal operating speed value of the machine, a selected one of the tachometers having set therein two underspeed setpoints defining uppermost and lowermost underspeed setpoints, the remaining underspeed setpoints being staggered between the uppermost and lowermost setpoints, there being a total of N+1 underspeed setpoints being separated by an amount greater than a speed sensing accuracy of the apparatus and at least one underspeed setpoint associated with each speed signal, each tachometer further having set therein an overspeed setpoint having a value greater than the normal operating speed value, there being a total of N overspeed setpoints with one overspeed setpoint associated with each speed signal, each tachometer providing outputs indicative of whether the speed signal that it receives is above or below the overspeed and underspeed setpoints set therein; and, b) processing means receiving the outputs from the plural tachometers for: (i) determining whether one of the speed signals has a magnitude below the value of an associated underspeed setpoint when a second speed signal has a magnitude above an underspeed setpoint of greater value than the said underspeed setpoint associated with said one speed signal, and, in response, providing a first signal indicating that the sensor whose speed signal had the magnitude below the value of its associated underspeed setpoint has failed; and, (ii) determining whether any tachometer indicates that its associated speed signal has a magnitude above the value of its associated overspeed setpoint and below the value of its associated underspeed setpoint, and, in response, providing a second signal that the tachometer providing the indication has failed.

14. In a rotating machine having a plurality of sensors each providing speed signals for measuring machine speed, a method of detecting sensor failure comprising the steps of:

a) providing a plurality of underspeed setpoints having respective values staggered below a normal operating speed value of the machine;

b) determining whether any one speed signal has a magnitude below the value of one of the underspeed setpoints when another speed signal has a magnitude above another underspeed setpoint of greater value than the value of said one of said underspeed setpoints; and, c) providing, in response to an affirmative determination in step (b), an indication that a sensor has failed.

15. Method according to claim 14 further comprising the steps of:

e) providing a plurality of overspeed setpoints having values above the normal operating speed value;

f) determining whether there is an indication that a speed signal has a magnitude above the value of an overspeed setpoint and below the value of an underspeed setpoint; and, g) providing, in response to an affirmative determination in step (f), an indication of a system failure.

* * * * *